(12) United States Patent
Go

(10) Patent No.: US 9,511,821 B2
(45) Date of Patent: Dec. 6, 2016

(54) CYCLE WITH SINGLE WHEEL

(71) Applicant: Jong Hwa Go, Ulsan (KR)

(72) Inventor: Jong Hwa Go, Ulsan (KR)

(*) Notice: Subject to any disclaimer, the term of this patent is extended or adjusted under 35 U.S.C. 154(b) by 0 days.

(21) Appl. No.: 14/785,410

(22) PCT Filed: Apr. 17, 2014

(86) PCT No.: PCT/KR2014/003343
§ 371 (c)(1),
(2) Date: Oct. 19, 2015

(87) PCT Pub. No.: WO2014/171756
PCT Pub. Date: Oct. 23, 2014

(65) Prior Publication Data
US 2016/0052600 A1   Feb. 25, 2016

(30) Foreign Application Priority Data

Apr. 18, 2013 (KR) .................. 10-2013-0042581

(51) Int. Cl.
*B62M 11/02* (2006.01)
*B62K 1/00* (2006.01)
*B62M 1/38* (2013.01)

(52) U.S. Cl.
CPC ................. *B62M 11/02* (2013.01); *B62K 1/00* (2013.01); *B62M 1/38* (2013.01)

(58) Field of Classification Search
CPC ....................................................... B62K 1/00
See application file for complete search history.

(56) References Cited

U.S. PATENT DOCUMENTS 1,494,504 A * 5/1924 Robbins ................... B62K 1/00
                                                                 238/21
4,694,708 A * 9/1987 Hartmann ................ B62M 1/38
                                                                280/260

(Continued)

FOREIGN PATENT DOCUMENTS

CN          2098439          3/1992
CN          2101014          4/1992

(Continued)

OTHER PUBLICATIONS

International Search Report and Written Opinion from PCT/KR2014/003343 dated Jul. 18. 2014.

*Primary Examiner* — Kevin Hurley
(74) *Attorney, Agent, or Firm* — Calfee, Halter & Griswold LLP

(57) ABSTRACT

The present invention relates to a cycle with a single wheel, and a cycle with a single wheel according to the present invention includes: a wheel with a central hub; a roller contacting the inside surface of the hub with a plurality of roller shafts connected to both ends of the hub, the roller shafts being separated from each other with a given interval; a hub cover with the outside connected to the end part of a cycle body; a gear shaft provided with a first multi-stage gear and connected to the hub cover so as to be positioned between the plurality of roller shafts; and a pedal shaft inserted through a hole formed in a given position of the hub cover so as to penetrate the hub, wherein the pedal shaft is mounted with a gear engaging with one end of the first multi-stage gear, and a second multi-stage gear is inserted with one end thereof spaced from the gear to engage with the other end of the first multi-stage gear and the other end thereof engaging with a gear part formed in the inner peripheral surface of the hub, so that a drive force generated by the pedal is transferred through the gear mounted on the (Continued)

pedal shaft to the first multi-stage gear, and the drive force transferred to the first multi-stage gear is transferred through the second multi-stage gear to the gear part, thus rotating the wheel.

1 Claim, 2 Drawing Sheets

(56) References Cited

U.S. PATENT DOCUMENTS

| | | | | |
|---|---|---|---|---|
| 7,762,569 | B2* | 7/2010 | Fraser | B62K 1/00 |
| | | | | 280/205 |
| 9,114,841 | B2* | 8/2015 | Go | B62M 11/16 |
| 2003/0228961 | A1* | 12/2003 | Huang | B62K 1/00 |
| | | | | 482/110 |
| 2011/0041635 | A1* | 2/2011 | Liu | B62M 1/36 |
| | | | | 74/319 |

FOREIGN PATENT DOCUMENTS

| | | |
|---|---|---|
| JP | 2002-059884 | 2/2002 |
| JP | 4478963 | 6/2010 |
| KR | 20110028418 | 3/2011 |
| KR | 201220012880 | 2/2012 |

* cited by examiner

CYCLE WITH SINGLE WHEEL

RELATED APPLICATIONS

The present application is the U.S. national phase entry of PCT/KR2014/003343, with an international filing date of Apr. 17, 2014, which claims the benefit of Korean Patent Application No. 10-2013-0042581, filed Apr. 18, 2013, the entire disclosures of which are incorporated herein by reference.

TECHNICAL FIELD

The present invention relates to a cycle with a single wheel, in detail, a cycle with a single wheel that easily transmits a driving force by distributing and transmitting the center of gravity of a rider under the center of the wheel with a pedal shaft at a front portion of the wheel.

BACKGROUND ART

A "Ssing sing barqeui" has been disclosed in Korean Patent Application Publication No. 10-2009-0086194. The related art is characterized in that, in order to solve the problem that a rider cannot maintain a stable posture on a bicycle in which gravity applied to a saddle disposed outside an outer wheel is transmitted to a point of the center of a wheel, gravity applied to the saddle is transmitted to two or more points including the center of a wheel, a rider is allowed to balance in the front-rear direction by positioning the rider to a front portion similar to bicycles to maintain an angle allowing the rider to conveniently press pedals for riding, a brake similar to common bicycles is installed by installing a device transmitting a driving force, and a shifting and coupling device inside a hub disposed inside a wheel, and a stable operation can be provided by controlling inertia.

However, the technology described above provides a structure essential to exhibit the principle of the invention, but shifting is complicated and it is difficult to make in a product.

DISCLOSURE

Technical Problem

The present invention has been made in an effort to solve the problem, and first, an object of the present invention is to provide a cycle with a single wheel that can maintain a stable posture by distributing the weight of a rider under the center of a wheel to achieve a cycle with a single wheel that is easy to ride and can be efficiently driven.

Second, another object of the present invention is to provide a cycle with a single wheel that can easily transmit a driving force by positioning a pedal shaft ahead of the center of the wheel, has a large rotation ratio using gears, can coast using a free wheel, and can easily handle operation of a brake.

Third, it is possible to prevent dirt from flowing into a driving unit or prevent the clothes of a rider pressing down a pedal being stuck in the driving unit.

Technical Solution

In order to achieve the object and other objects of the present invention, according to an embodiment of the present invention, there is provided a cycle with a single wheel including: a wheel with a central hub; a roller contacting the inside surface of the hub with a plurality of roller shafts connected to both ends of the hub, the roller shafts being separated from each other with a given interval; a hub cover with the outside connected to the end part of a cycle body; a gear shaft provided with a first multi-stage gear and connected to the hub cover so as to be positioned between the plurality of roller shafts; and a pedal shaft inserted through a hole formed in a given position of the hub cover so as to penetrate the hub, wherein the pedal shaft is mounted with a gear engaging with one end of the first multi-stage gear, and a second multi-stage gear is inserted with one end thereof spaced from the gear to engaged with the other end of the first multi-stage gear and the other end thereof engaging with a gear part formed in the inner peripheral surface of the hub, so that a driving force generated by the pedal is transferred through the gear mounted on the pedal shaft to the first multi-stage gear, and the driving force transferred to the first multi-stage gear is transferred through the second multi-stage gear to the gear part, thus rotating the wheel.

Advantageous Effects

According to an embodiment of the present invention, first, it is possible to maintain a stable posture by distributing the weight of a rider under the center of a wheel to achieve a cycle with a single wheel that is easy to ride and can be efficiently driven.

Second, it is possible to easily transmit a driving force by positioning a pedal shaft ahead of the center of the wheel, have a large rotation ratio using gears, coast using a free wheel, provide time space for balancing, and easily handle operation of a brake.

Third, it is possible to prevent dirt from flowing into a driving unit or prevent the clothes of a rider pressing down a pedal being stuck in the driving unit.

REFERENCE NUMERALS

Figure 1:
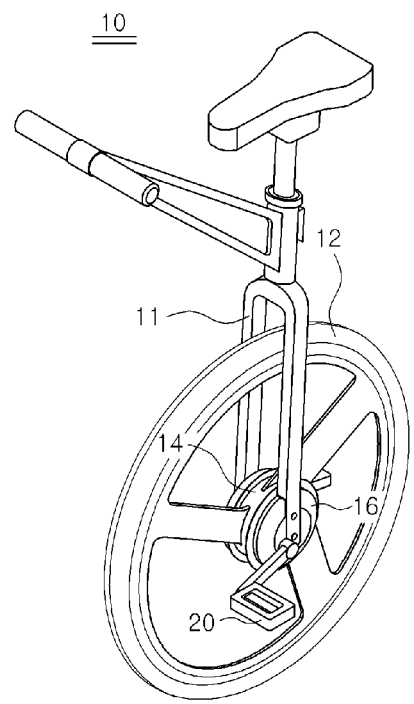
FIG. 1 is a perspective view of a cycle with a single wheel according to an embodiment of the present invention.

11; cycle body
12; wheel
14; hub
14a; gear unit
16; hub cover
16a; hole
17; roller
18; roller shaft
20; pedal
22; gear
24; pedal shaft
25; bearing
26; second multi-stage gear 27; free wheel
28; first multi-stage gear
30; gear shaft

MODES OF THE INVENTION

Figure 2:
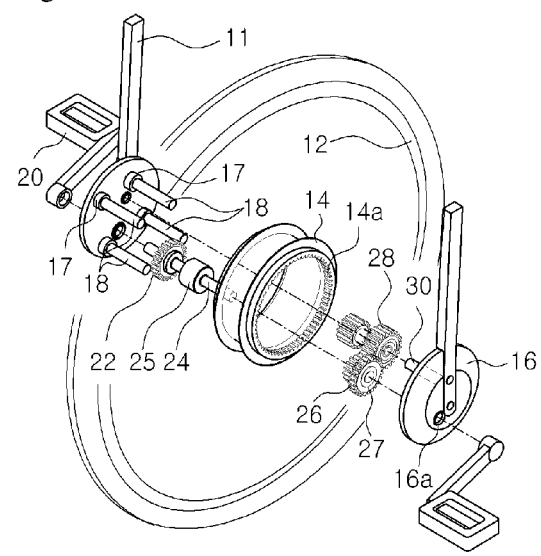
FIG. 2 is an exploded perspective view of the cycle with a single wheel according to an embodiment of the present invention.
Figure 3:
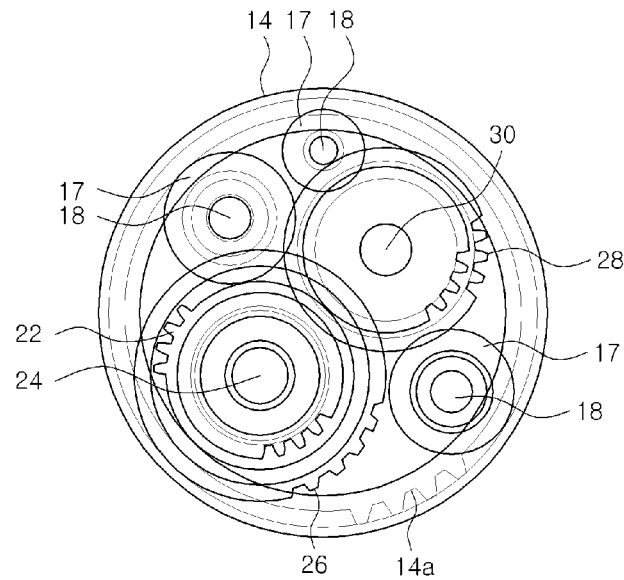
FIG. 3 is a cross-sectional view of a hub illustrating arrangement of a pedal shaft, a gear shaft, and a roller shaft, gears fitted on the shafts, and the position of rollers illustrated in FIG. 2.
Figure 4:
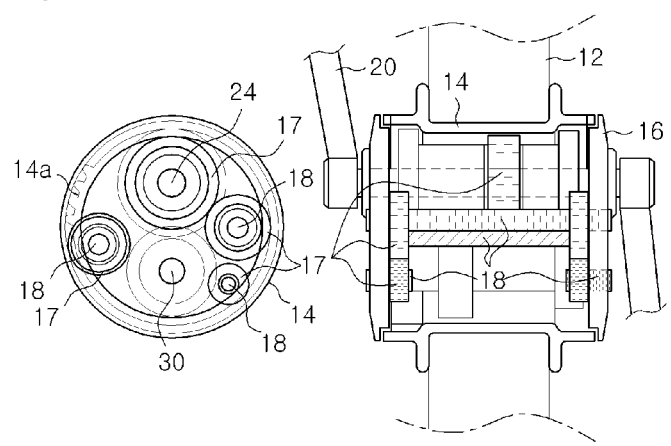
FIGS. 4 and 5 are a side projection view and a front projection view illustrating the structure of the present invention.
Figure 5:
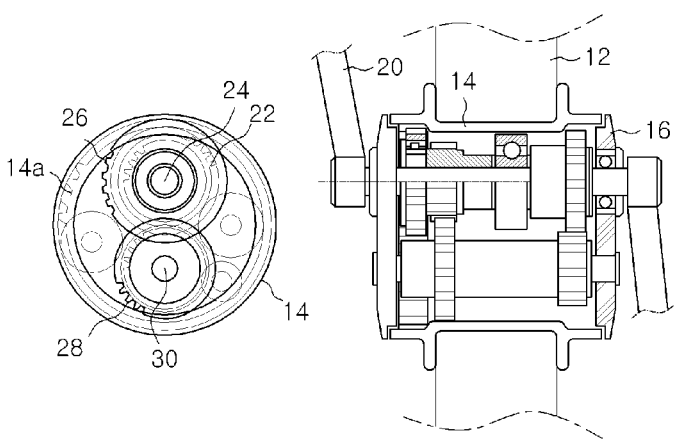

Hereinafter, preferred embodiments of the present invention will be described with reference to accompanying drawings FIG. 1 is a perspective view of a cycle with a single wheel according to an embodiment of the present invention, FIG. 2 is an exploded perspective view of the cycle with a single wheel according to an embodiment of the present invention, FIG. 3 is a cross-sectional view of a hub illustrating arrangement of a pedal shaft, a gear shaft, and a roller shaft, gears fitted on the shafts, and the position of rollers illustrated in FIG. 2, and FIGS. 4 and 5 are a side projection view and a front projection view illustrating the structure of the present invention As illustrated in FIG. 2, a cycle 10 with a single wheel according to an embodiment of the present invention includes a cycle body 11, a wheel 12, and a power generating unit.

The wheel 12 has a hub 14 at the center. A space where at least the power generating unit to be described below can be installed is formed in the hub 14.

A hub cover 16 is coupled to both ends of the hub 14 and has a plurality of roller shafts 18 equipped with rollers being in contact with the inner side of the hub 16 and spaced from each other with regular intervals.

Two or more rollers are provided such that gravity transmitted from the cycle body 11 is not transmitted to the center of the wheel 12, but distributed to the inside of the hub 14 under the center, and one or more rollers are provided to be in contact with the inner side of the hub 14 so that the rollers above the center of the wheel 12 make a rotational axis of the wheel together with the rollers under the center of the wheel 12.

The power generating unit is composed of a pedal shaft 24 equipped with the pedal 20 and the gear 22, a second multi-stage gear 26 fitted on the pedal shaft 24 at a predetermined distance from the gear 22, and a gear shaft 30 having a first multi-stage gear 28.

The pedal shaft 24 is inserted in a hole 16a formed at the hub cover 16 through the hub 14 out of the center of the wheel 12 and a bearing 25 is disposed at a predetermined longitudinal position.

The gear shaft 30 is coup-led to the hub cover 16 to be positioned in parallel with the pedal shaft 24 at a predetermined distance from the pedal shaft 24 between a plurality of roller shafts 18 such that on end of the first multi-stage gear 28 is engaged with the gear 22.

The second multi-stage gear 26 is freely rotatably fitted on the pedal shaft 24 at a predetermined distance from the gear 22, with one end engaged with the first multi-stage gear 28 and the other end engaged with a gear portion 14a formed on the inner side of the hub 14.

Further, the second multi-stage gear 26 may have a free wheel 27 that provides a space for balancing when a pedal is operated one time and allowing driving by inertia on a downhill and a flatland even the pedal is not operated.

A driving force generated by the pedal 20 is transmitted to the first multi-stage gear 28 through the gear 22 fitted on the pedal shaft 24 and the driving force transmitted to the first multi-stage gear 28 is transmitted to the gear portion 14a through the second multi-stage gear 26, thereby rolling the wheel 12.

In this case, the second multi-stage gear 26 transmits the driving force generated by the pedal 20 to the gear portion 14a formed on the inner side of the hub 14 having a different diameter, with a rotation ratio changed. According to this configuration, the forward movement distance and time of the wheel 12 are increased, so a space for balancing is provided even by rolling the pedal one cycle, as compared with cycles with a single wheel of the related art, and an environment allowing for long-distance driving is provided.

As described above, the present invention relates to a cycle with a single wheel, but the shape of the cycle body may be changed by those skilled in the art without departing from the spirit of the present invention described in claims, or the present invention may be modified for cycles with one or more wheels, and those modifications are included in the present invention.

INDUSTRIAL APPLICABILITY

The present invention is available for cycle with a single wheel that can distribute the center of gravity of a rider under the center of the wheel and can easily transmit a driving force by positioning a pedal shaft ahead of the wheel.

The invention claimed is:

1. A cycle with a single wheel comprising: a wheel with a central hub; a roller contacting the inside surface of the hub with a plurality of roller shafts connected to both ends of the hub, the roller shafts being separated from each other with a given interval; a hub cover with the outside connected to the end part of a cycle body; a gear shaft provided with a first multistage gear and connected to the hub cover so as to be positioned between the plurality of roller shafts; and a pedal shaft inserted through a hole formed in a given position of the hub cover so as to penetrate the hub, wherein the pedal shaft is mounted with a gear engaging with one end of the first multi-stage gear, and a second multi-stage gear is inserted with one end thereof spaced from the gear to engaged with the other end of the first multi-stage gear and the other end thereof engaging with a gear part formed in the inner peripheral surface of the hub, so that a driving force generated by the pedal is transferred through the gear mounted on the pedal shaft to the first multi-stage gear, and the driving force transferred to the first multi-stage gear is transferred through the second multi-stage gear to the gear part, thus rotating the wheel.

* * * * *